United States Patent
Zhu et al.

(10) Patent No.: US 8,804,777 B2
(45) Date of Patent: Aug. 12, 2014

(54) MID-INFRARED SUPERCONTINUUM FIBER LASER

(71) Applicant: The Arizona Board of Regents on Behalf of The University of Arizona, Tucson, AZ (US)

(72) Inventors: Xiushan Zhu, Tucson, AZ (US); Nasser N. Peyghambarian, Tucson, AZ (US); Robert A. Norwood, Tucson, AZ (US)

(73) Assignee: Arizona Board of Regents on Behalf of The University of Arizona, Tucson, AZ (US)

( * ) Notice: Subject to any disclaimer, the term of this patent is extended or adjusted under 35 U.S.C. 154(b) by 0 days.

(21) Appl. No.: 14/075,632

(22) Filed: Nov. 8, 2013

(65) Prior Publication Data

US 2014/0133500 A1     May 15, 2014

Related U.S. Application Data

(60) Provisional application No. 61/796,406, filed on Nov. 9, 2012.

(51) Int. Cl.
*H01S 3/30*      (2006.01)
*H01S 3/067*      (2006.01)

(52) U.S. Cl.
CPC ................... *H01S 3/06716* (2013.01)
USPC ............... 372/6; 372/105; 372/101; 372/99; 372/98

(58) Field of Classification Search
USPC ................... 372/6, 105, 101, 99, 98
See application file for complete search history.

(56) References Cited

U.S. PATENT DOCUMENTS

| | | | | |
|---|---|---|---|---|
| 5,084,880 A | * | 1/1992 | Esterowitz et al. | 372/6 |
| 6,356,387 B1 | * | 3/2002 | Ohishi et al. | 359/341.5 |
| 6,658,189 B2 | * | 12/2003 | Ajima et al. | 385/123 |

OTHER PUBLICATIONS

K.-D. F. Büchter, H. Herrmann, C. Langrock, M. M. Fejer, and W. Sohler, "All-optical Ti: PPLN wavelength conversion modules for free-space optical transmission links in the mid-infrared," Opt. Lett. 34, 470-472 (2009).

S. T. Sanders, "A wavelength-agile source for broadband sensing," Appl. Phys. B 75, 799-802 (2002).

M. G. Allen, "Diode laser absorption sensors for gas-dynamic and combustion flows," Meas. Sci. Technol. 9(4), 545-562 (1998).

K. Kikuchi, K. Taira, and N. Sugimoto, "Highly nonlinear bismuth oxide-based glass fibers for all-optical signal processing," Electron. Lett. 38, 166-167 (2002).

J. Gopinath, H. Shen, H. Sotobayashi, E. Ippen, T. Hasegawa, T. Nagashima, and N. Sugimoto, "Highly nonlinear bismuth-oxide fiber for smooth supercontinuum generation at 1.5 µm," Opt. Express 12, 5697-5702 (2004).

G. Brambilla, F. Koizumi, V. Finazzi, and D. J. Richardson, "Supercontinuum generation in tapered bismuth silcate fibres," Electron. Lett. 41,795-797 (2005).

(Continued)

*Primary Examiner* — Kinam Park
(74) *Attorney, Agent, or Firm* — Yakov Sidorin; Quarles & Brady LLP

(57) ABSTRACT

Mid-IR supercontinuum laser source in the 3-12 micron region generating at least tens of watts of optical power and based on non-silica optical fiber pumped by a ZBLAN fiber laser generating light at about 2.7 microns. The zero-dispersion wavelength of the non-silica fiber substantially coincides with the lasing wavelength. The proportion of the SC output above 3 microns exceeds 40 percent of the overall power output.

13 Claims, 10 Drawing Sheets

(56) References Cited

OTHER PUBLICATIONS

J. T. Gopinath, H. M. Shen, H. Sotobayashi, E. P. Ippen, T. Hasegawa, T. Nagashima, and N. Sugimoto, "Highly nonlinear bismuth-oxide fiber for supercontinuum generation and femtosecond pulse compression," J. Lightwave Technol. 23, 3591-3596 (2005).

R. Buczynski, H. T. Bookey, D. Pysz, R. Stepien, I. Kujawa, J. E. McCarthy, A. J. Waddle, A. K. Kar, and M. R. Taghizadeh, "Supercontinuum generation up to 2.5 μm in photonic crystal fiber made of lead-bismuth-galate glass," Laser Phys. Lett. 7(9), 666-672 (2010).

J. S. Sanghera, I. D. Aggarwal, L. B. Shaw, C. M. Florea, P. Pureza, V. Q. Nguyen, and F. Kung, "Nonlinear properties of chalcogenide glass fibers," J. Optoelectron. Adv. Mater. 8, 2148-2155 (2006).

A. Marandi, C. Rudy, V. Plotnichenko, E. Dianov, K. Vodopyanov, and R. Byer, "Mid-infrared supercontinuum generation in tapered chalcogenide fiber for producing octave-spanning frequency comb around 3 μm," Opt. Express 20, 24218-24225 (2012).

G. Genty, S. Coen, and J. M. Dudley, "Fiber supercontinuurn sources (Invited)," J. Opt. Soc. Am. B 24, 1771-1785 (2007).

X. Yan, G. Qin, M. Liao, T. Suzuki, and Y. Ohishi, "Transient Raman response and soliton self-frequency shift in tellurite microstructured fiber," J. Appl. Phys. 108(12), 123110 (2010).

A. Ben-Salem, R. Cherif, and M. Zghal, "Raman response of a highiy nonlinear As2Se3-based chalcogenide photonic crystal fiber," Proc. PIERS, 1256-1260, Marrakesh, Morocco (2011).

T. M. Monro and H. Ebendorff-Heidepriem, "Progress in microstructured optical fibers," Annu. Mater. Res. 36(1), 467-495 (2006).

K. Richardson, D. Krol, and K. Hirao, "Glasses for photonic applications," Int. J. Appl. Glass. Sci. 1(1), 74-86 (2010).

J. M. Dudley, G. Gentry, and S. Coen, "Supercontinuum generation in photonic crystal fiber," Rev. Mod. Phys. 78(4), 1135-1184 (2006).

R. Stegeman, L. Jankovic, H. Kim, C. Rivero, G. Stegeman, K.Richardson, P. Delfyett, Y. Guo, A. Schulte, and T. Cardinal, "Tellurite glasses with peak absolute Raman gain coefficients up to 30 times that of fused silica," Opt. Lett. 28(13), 1126-1128 (2003).

C. Xia. M. Kumar, M. -Y. Cheng, R. S. Hegde, M. N. Islam, A. Galvanauskas, H. G. Winful, F. L. Terry, M. J. Freeman, M. Poulain, and G. Mazé, "Power scalable mid-infrared supercontinuum generation in ZBLAN fluoride fibers with up to 1.3 watts time-averaged power," Opt. Express 15, 865-871 (2007).

J. S. Sanghera and I. D. Aggarwal, "Active and passive chalcogenide glass optical fibers for IR applications; a review," J. Non-Cryst. Solids 256-257, 6-16 (1999).

Rim Cherif, Amine Ben Salem, Mourad Zghal, Pascal Besnard, Thierry Chartier, Laurent Brilland and Johann Troles, "Highly nonlinear As2Se3-based chalcogenide photonic crystal fiber for midinfrared supercontinuum generation," Opt. Eng. 49(9), 095002 (2010).

N. Granzow, S. Stark, M. Schmidt, A. Tverjanovich, L. Wondraczek, and P. Russell, "Subercontinuum generation in chalcogenide-silica step-index fibers," Opt. Express 19, 21003-21010 (2011).

\* cited by examiner

MID-INFRARED SUPERCONTINUUM FIBER LASER

CROSS REFERENCE TO RELATED APPLICATIONS

This application claims the benefit of and priority from the U.S. Provisional Patent Application No. 61/796,406 filed on Nov. 9, 2012 and titled "High Power Mid-Infrared Supercontinuum Fiber Lasers at 2-5 microns". The disclosure of the above-identified provisional application is incorporated by reference herein in its entirety.

TECHNICAL FIELD

The present invention relates to all-fiber optical sources generating high-level (in excess of tens of watts) supercontinuum optical power generation in spectral windows of 3-5 microns and up to 12 microns.

SUMMARY OF THE INVENTION

An embodiment of the present invention provides an all-optical-fiber light source that includes (i) an $Er^{3+}$-doped pump fiber laser structured to generate light at a lasing wavelength within a spectral range of pump; and (ii) a non-silica-glass optical fiber in optical communication with said pump fiber laser and having a zero-dispersion wavelength substantially equal to the lasing wavelength. In one embodiment, the lasing wavelength is defined within the region from about 2.65 microns to about 3 microns. In addition to optionally generating power output at wavelengths below 3 microns, this all-optical-fiber light source produces a supercontinuum (SC) light power output in the spectral region exceeding 3 microns when such non-silica-glass optical fiber is pumped by the pump fiber laser that operates in a pulsed regime at the lasing wavelength. The ratio of the SC light power output to a total light power output produced exceeds 40 percent. The long-wavelength boundary of such SC light power output exceeds 4 microns. In one implementation, the non-silica-glass optical fiber may include a tellurite fiber having a zero-dispersion wavelength of about 2.7 microns defined at least in part by a negative waveguide dispersion of said fiber when the pump fiber laser includes a mode-locked $Er^{3+}$-doped ZBLAN pump fiber laser generating light at the lasing wavelength of about 2.78 microns and powers exceeding 4 kW. The tellurite fiber may be a W-type fiber. Alternatively, the non-silica-glass optical fiber may includes an $As_2Se_3$ chalcogenide optical fiber having a zero-dispersion wavelength of about 2.7 microns defined at least in part by a positive waveguide dispersion of said fiber, when the pump fiber laser includes a mode-locked $Er^{3+}$-doped ZBLAN pump fiber laser generating light at the lasing wavelength of about 2.78 microns and power of about 144 W or above. In yet another specific case, the non-silica-glass optical fiber may include a chalcogenide PCF optical fiber having a zero-dispersion wavelength of about 2.7 microns, while the pump fiber laser includes a mode-locked $Er^{3+}$-doped ZBLAN pump fiber laser generating light at the lasing wavelength of about 2.78 microns with powers of about 1 kW and a pulse duration of less then 1 ps. In the latter implementation, the ratio exceeds 80 percent and the long-wavelength boundary exceeds 11 microns.

An embodiment of the invention further provides a pulsed fiber laser that contains (i) an $Er^{3+}$-doped ZBLAN optical fiber having input and output facets; and (ii) a saturable absorber in optical communication with the output facet of said optical fiber. When energized with light at about 976 nm through the input facet, such optical fiber generates a train of pulses at a lasing wavelength of about 2.78 microns. Optionally, the saturable absorber includes a $Fe^{2+}$:ZnSe crystal, and the fiber laser is operable in a mode-locking regime. Alternatively or in addition, the fiber laser may include a non-silica-glass optical fiber in optical communication with the output facet and having a zero-dispersion wavelength substantially equal to the lasing wavelength; and produce a supercontinuum (SC) light power output in a spectral region exceeding 3 microns, when pumped by the train of pulses. A ratio of the SC light power output to a total light power output of the fiber laser exceeds 40 percent, and a long-wavelength boundary of the SC light power output exceeds 4 microns. In a specific case, such ratio exceeds 80 percent and the long-wavelength boundary exceeds 11 microns.

BRIEF DESCRIPTION OF THE DRAWINGS

The invention will be more fully understood by referring to the following Detailed Description of Specific Embodiments in conjunction with the generally not-to-scale Drawings, of which.

DETAILED DESCRIPTION OF SPECIFIC EMBODIMENTS

Figure 1:
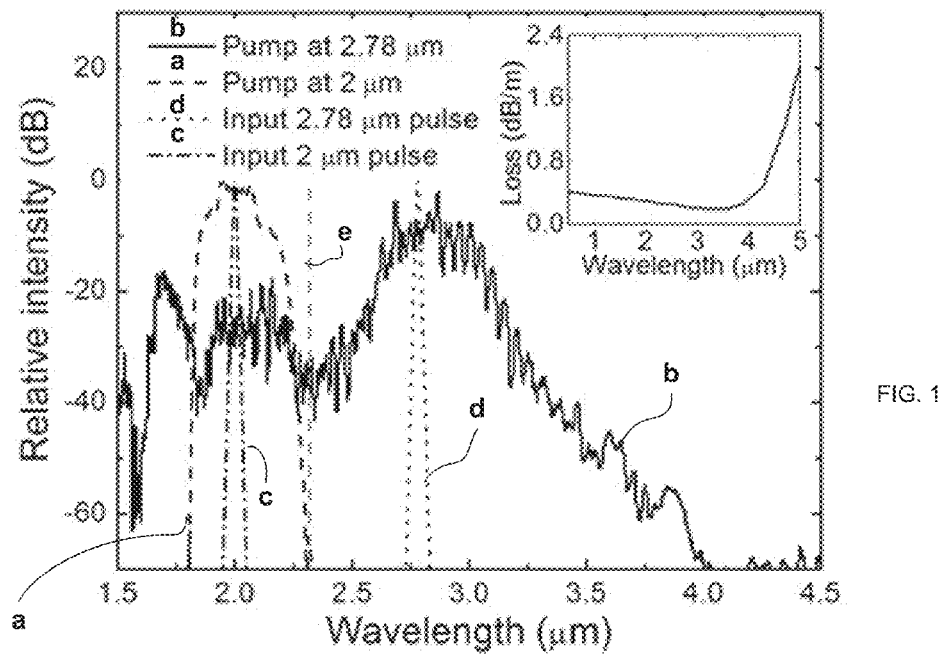
FIG. 1 includes plots representing the spectra of supercontinuum (SC) generated in a 60 cm conventional tellurite fiber. Inset: propagation loss of the single-mode tellurite optical fiber.

High-power broadband laser sources in the mid-infrared (mid-IR) wavelength range have become the subject of attention in recent years because of the various applications of mid-IR light across the spectrum of industries, including astronomy, remote sensing and ranging, detection of chemicals, spectroscopy, and biomedical surgery, to name just a few. Supercontinuum (SC) generation, in which the spectrum of a laser undergoes substantial spectral broadening through the interplay of nonlinear effects (including, for example, self-phase modulation or SPM, cross phase modulation, four wave mixing, Raman scattering, and modulation instability) has been investigated to obtain ultra-broadband high-brightness light sources. SC generation has been observed in a wide variety of nonlinear media including organic and inorganic liquids, gases, bulk solids, and waveguides.

A skilled artisan will appreciate that optical fibers are well fitted, operationally, to generate SC because they can provide a significant length for nonlinear interaction of light with the medium. While SC sources of light with spectra spanning from about 0.4 μm to about 2.4 μm have been demonstrated in a micro structured silica fiber, such optical fiber has two substantial shortcomings operationally limiting the possibility to generate mid-IR SC light output. These shortcomings stem from a low nonlinearity characteristic of the silica fiber (nonlinear refractive index on the order of $n_2=2.2\times10^{-20}$ $m^2/W$) and a short IR transmission edge (specifically, below 3 μm). The idea of the present invention stems from the realization that a non-silica glass optical fiber (such as, for example, that based on ZBLAN or $ZrF_4$—$BaF_2$—$LaF_3$—$AlF_3$—NaF, bismuth, tellurite, or chalcogenide glass), can overcome one or both of the above-identified constraints and support the mid-IR SC generation of light. These glasses have high transmission characteristics in the mid-IR or even across the long-wave IR region and have nonlinearity parameters comparable to or higher than that of silica.

As far as the bismuth fiber ($n_2=3.2\times10^{-19}$ $m^2/W$) is concerned, in the absence of any practical demonstrations to the contrary, theoretical calculations pertaining to the use of the bismuth optical fiber indicate that the efficiency of the SC generation in such fiber in the mid-IR does not exceed approximately 5%.

While ZBLAN glass is the most stable heavy metal fluoride glass, a good host for rare-earth ions, and has low intrinsic loss and wide transparency window, a ZBLAN-based optical fiber has an $n_2$ value comparable to that of a silica fiber and, therefore, extensive lengths of the fiber have to be used to realize a SC light-source with any practically meaningful conversion efficiency and flatness (which term refers to the pre-defined degree of variation of spectral power density over a wavelength range). Moreover, since the zero dispersion wavelength (ZDW) of ZBLAN is about 1.6 μm, pump light at a wavelength close to 1.6 μm is generally required for the broadband SC generation, which inevitably results in a relatively low portion of the output power in the mid-IR in the SC. For instance, for a ZBLAN-optical-fiber-based SC laser source, the spectral output of which spans over a region of ~0.8-4 μm, most of the laser-power output is concentrated in the spectral region below 3 μm and the IR edge is only 4 μm. In another example, a SC light-output from 0.35 to 6.28 μm produced in a centimeter-long ZBLAN fiber due to pumping at 1.45 μm with a femtosecond laser has the output power at the level of only mW's and the total power in the spectral mid-IR region beyond 3 μm is less than about 5 mW. The above considerations show that the ZBLAN-based optical fiber is not an ideal candidate for high power mid-IR SC generation in the 3-12 μm wavelength region.

Because tellurite has higher strength and chalcogenide has a longer IR transmission edge (~12 μm) than ZBLAN glass and both of these glasses have higher $n_2$ than ZBLAN glass, tellurite and chalcogenide fibers are generally also considered as promising candidates for high power mid-IR SC laser sources with high spectral power densities in the 3-5 μm and 8-12 μm atmospheric windows and molecular "fingerprint" region. However, the mid-IR power proportion of existing tellurite fiber based SC laser sources is as small as that of ZBLAN fiber based sources because they are pumped in the near-IR. Moreover, the small effective core area of either microstructured or tapered tellurite fiber leads, in practice, to breakdown damage of the fiber during operation, thereby constraining the power scaling of such SC laser sources. In one example of a SC laser source based on a microstructured tellurite PCF with an IR edge extending to 4.5 μm, a ZDW of 1380 nm, and a pump pulse at about 1559 nm, the average power output of the SC is only 70 mW with most of the power output confined to the spectral region below 2 μm. In addition, the effective area of the fiber mode is only 1.7 $μm^2$ and power scaling of this SC fiber laser source is highly limited by the damage of the fiber end facet under high power pumping. As far as solid-cladding large core tellurite fibers are concerned, it is hard to obtain an ultra-broadband SC light output in a conventional step-indexed fiber because substantial spectral broadening generally occurs in an optical fiber pumped at a wavelength close to the ZDW, while most current readily available ultrafast laser sources have wavelengths much shorter than the ZDW (2.3 μm) of tellurite glass.

Similarly, while chalcogenide glass possesses high nonlinearity ($n_2=1.5\times10^{-17}$ m²/W) and desired IR transmission (up to 12 μm), when used as a medium for an optical-fiber-based SC laser source it demonstrates an IR edge below 3 μm and low average output power, at least in part because the pump wavelength is below 2 μm while, at the same time, the damage threshold of chalcogenide optical fiber is relatively low. Although SC generation with a bandwidth from 2.2 to 5 μm was shown in a tapered $As_2Se_3$ fiber pumped with a solid-state laser at 3.1 μm, the resulting output bandwidth was still very narrow as compared to the potentially ultra-broad transmission bandwidths of an SC source utilizing a chalcogenide fiber. To the best of the inventors' knowledge, a fiber laser operating in a mode-locking regime in the vicinity of 3.0 microns is not available to-date.

The present invention solves the above-identified problems by providing an optical-fiber-based SC light source generating a SC light-output in the range from about 2 microns to about 5 microns, having an IR edge up to 12 microns, and governed by a pump laser operating in the vicinity of 3 microns. In one example, the SC light-source of the invention is defined by an ultrafast fiber-laser operating at 2.78 microns and pumping a chalcogenide PCF with a ZDW shifted to about 2.78 microns. According to the idea of the invention, the ZDW (of about 5 μm) of the chalcogenide glass is shifted to the vicinity of the wavelength of operation of a pump laser (to about 3 μm) and not to 1 micron, 1.5 micron, or 1.9 micron where $Yb^{3+}$-, $Er^{3+}$-, and $Tm^{3+}$-ultrafast silica fiber pump lasers operate, thereby reducing the operational and material toll on the resulting fiber-optic system. At the same time, because the effective area of the chalcogenide PCF with ZDW of about 3 μm, structured according to the invention, is unexpectedly more than 3 times larger than that of either a conventional tapered optical fiber or a PCF with the ZDW below 2 μm, the chalcogenide PCF according to the invention operationally withstands and accommodates much higher levels of pump power and, consequently, is used to generate substantially more powerful mid-IR SC light than any of those discussed in related art.

As presented below, the propagation and evolution of the 2.78 μm pump pulses in the tellurite and chalcogenide optical fibers were calculated by solving the generalized nonlinear Schrödinger equation (GNLSE). Due to their large core sizes, the proposed tellurite and chalcogenide fibers show significant promise for power scaling. Simulation results show that several kW mid-IR SC with 40% of the light beyond 3 μm can be obtained in a "W" type tellurite fiber and tens-of-watt mid-IR SC spanning over 2-12 μm can be generated in a chalcogenide PCF.

Embodiment of an Algorithm

The pulse evolution inside tellurite and chalcogenide fibers were calculated by solving the GNLSE:

$$\frac{\partial A(z,t)}{\partial z} = -\frac{\alpha}{2}A(z,t) + \sum_{m\geq 2}\frac{i^{m+1}}{m!}\beta_m\frac{\partial^m A(z,t)}{\partial t^m} + i\gamma\left(1+\frac{i}{\omega_0}\frac{\partial}{\partial t}\right)\times\left(A(z,t)\int_{-\infty}^{+\infty}R(t')|A(z,t-t')|^2 dt'\right) \quad (1)$$

where $A(z, t)$ is the electric field envelope, is the loss coefficient, the terms $\beta_m$ are the various dispersion coefficients in the Taylor series expansion of the propagation constant $\beta$ at the central frequency $\omega_0$. The nonlinear coefficient $\gamma$ is given by:

$$\gamma = n_2\omega_0/(cA_{\it eff}) \quad (2)$$

where c is the speed of light, and $A_{\it eff}$ is the fiber's effective area. The response function R(t), which includes both electronic and vibrational Raman contributions, is given by:

$$R(t)=(1-f_R)\delta(t)+f_R h_R(t) \quad (3)$$

The three terms on the right-hand side of Eq. (1) describe the linear loss, dispersion effect, and nonlinear effects, respectively. The GNLSE was numerically solved using the split-step Fourier method under the assumption that the optical input was provided in the form of hyperbolic-secant optical pulses.

EXAMPLE 1

Mid-IR SC Generation in a Tellurite Optical Fiber

Tellurite (i.e., tellurium dioxide $TeO_2$ based) glasses offer optical transparency in the wavelength range from about 0.5 to about 5 μm, among the lowest phonon energy for oxide glasses, high nonlinear refractive index of $5.9\times10^{-19}$ m²/W, mechanical strength of >60 kpsi, and substantial resistance to moisture exposure. The combination of low phonon energy and high nonlinearity make tellurite glass fibers suitable for nonlinear applications such as SC generation in the mid-IR region, for example.

Mid-IR SC Generation in Conventional Tellurite Fiber. Although a conventional tellurite fiber has ostensibly suitable characteristics for mid-IR SC generation, the formation of a spectrally ultra-broad SC in such a fiber can be thought of as being rather questionable because the fiber's ZDW is at about 2.3 μm, while currently there does not exist an ultrafast fiber-laser source or a diode-pumped solid-state laser source at this wavelength that can be used as a laser pump. For this purpose, the most suitable pump sources available at the moment are a) the 2 μm $Tm^{3+}$-doped fiber laser and b) the 2.78 μm $Er^{3+}$ or $Ho^{3+}$-doped ZBLAN fiber laser provided by the present invention (and discussed below).

Accordingly, below is offered a comparison of the SC spectra of light generated in a conventional tellurite fiber pumped at 2 μm and at 2.78 μm. The used optical fiber parameters were as follows: core diameter of 8 μm; numerical aperture (NA) of 0.2; the fiber length of 60 cm. FIG. 1 shows the spectra of SC light output generated in the tellurite fiber pumped by 800 fs pulses (with a peak power of 12 kW) at 2 μm and at 2.78 μm, respectively. Curve a shows the SC spectrum of the tellurite fiber pumped at 2 μm, while the solid curve b illustrates the SC spectrum of the same fiber pumped at 2.78 μm. The spectra of the input pulses at 2 μm and 2.78 μm are represented by the dash-dotted curve c and the dotted curve d, respectively. The vertical dashed line e in FIG. 1 schematically indicates the fiber's ZDW. The inset of FIG. 1 is a plot illustrating the propagation loss of the tellurite fiber in the 0.5-5 μm wavelength range used in performing the simulation, which propagation loss was derived from the loss characteristics of a tellurite fiber measured in the 0.5-4.5 μm wavelength range previously measured and available at http://www.npphotonics.com.

Figure 2:
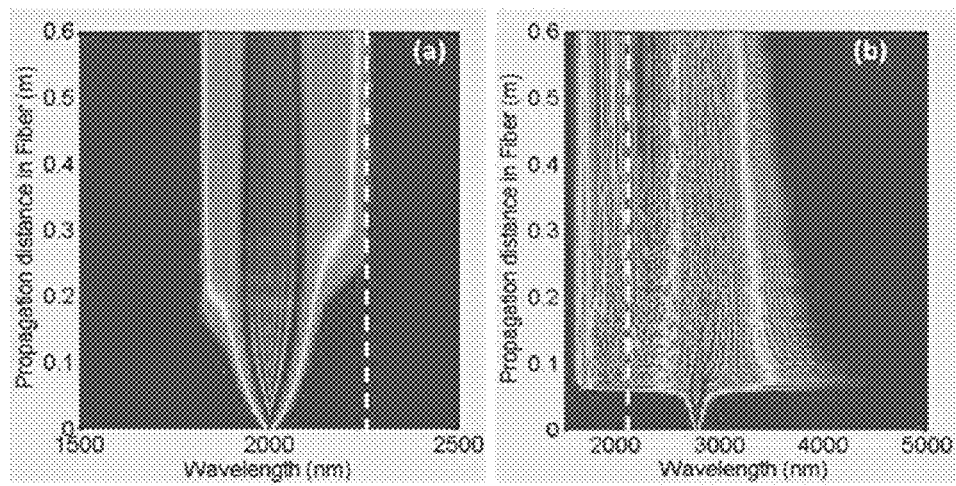
FIG. 2 shows the spectral evolution of the (a) 2 micron and (b) 2.78 micron 12 kW 800 fs pulses propagating in a 60 cm long tellurite optical fiber with a ZDW of 2.32 microns.

When the tellurite fiber is pumped at 2 μm (which wavelength lies within the normal group velocity dispersion (GVD) region), a narrow and approximately symmetrical SC spectrum a is obtained. The plot schematically illustrating the spectral evolution of the light pulses propagating in the fiber is presented in FIG. 2A. Because the pump wavelength is in the normal GVD region and substantially spectrally separated from the ZDW, the SPM is the dominant nonlinear process. The interaction of the SPM and the normal GVD leads to the approximately symmetric spectrum. Since the pump power is not sufficiently high to extend the SPM spectrum to the AWD, no spectral component can exceed the ZDW and fall into the anomalous GVD regime at a pump peak power of 12 kW, and accordingly significant spectral broadening is not observed. In contradistinction, when the same tellurite fiber is pumped at 2.78 μm (which wavelength is within the anomalous GVD region), the SC generation is dominated by soliton-related nonlinear effects that usually lead to significant spectral broadening, as evidenced by the corresponding SC output, curve b of FIG. 1, that has a bandwidth (at a −40 dB level) of nearly 2 μm. The plot representing the spectral evolution of the optical pulses is shown in FIG. 2B. Here, the spectrum of the 800 fs 2.78 μm pulses is substantially broadened over the 1.5-3.5 μm spectral region upon the first 10 cm (or less) of light propagation through the fiber. As the pulses propagate in the remaining 50-cm-long fiber segment, the long-wavelength wing of the SC spectrum shrinks slightly, which may be attributed to the periodic performance of solitons. Although the SC-output generated in a conventional tellurite fiber pumped at 2.78 μm is spectrally much broader than that pumped at 2 μm, the bandwidth and flatness of the SC are still fairly far from those of a SC laser source that could be characterized as a high-performance SC laser source (with a relatively flat spectrum from about 3 to about 5 microns and delivering about 40% or more of the SC power output at wavelengths above 3 microns).

Design of a W-type Dispersion-shifted Tellurite Fiber. It is appreciated that an ultra-broad bandwidth, high flatness SC light output can be obtained when a nonlinear fiber is pumped at a wavelength close to its ZDW. Since no readily available compact laser source operating at about 2. 3 microns (the ZDW of a conventional tellurite fiber) currently exists, a solution provided by an embodiment of the present invention is to shift the ZDW of the optical fiber to the wavelength of a readily available ultrafast laser source, for example by engineering the waveguide dispersion of the fiber. As was alluded to already above, the related art did not succeed in demonstrating such tapered or microstructured tellurite fibers (with ZDW in the near IR) that could be used to create a SC laser source with practically sufficient power scaling: the power scaling of SC laser sources based on available tellurite fibers is constrained by the low power damage threshold of the small fiber core, while at the same time the power distribution versus wavelength in the mid-IR region remains limited by the near-IR pump wavelength. In order to obtain a high power, high flatness, ultra-broad bandwidth SC with a large proportion of the output power falling within the mid-IR region, an embodiment of the present invention includes the fabrication of a W-type tellurite fiber and pumping such fiber with an embodiment of a mode-locked $Er^{3+}$-doped ZBLAN fiber laser at 2.78 μm (also discussed below). It is worth noting that, while a W-type fiber structure has already been demonstrated to shift the ZDW of silica fiber from 1.3 μm to 1.5 μm to suppress dispersion effects in long-haul optical communications, the related art is silent and seemingly unaware of an approach enabling a shift of the ZDW of a tellurite fiber from 2.3 μm towards the operating wavelength of 2.78 microns of a mode-locked $Er^{3+}$-doped ZBLAN fiber laser, which has not been yet realized. Moreover, in contradistinction to the usage of the microstructured tellurite fiber, the W-type tellurite optical fiber has a relatively large core (>8 μm core) and a solid cladding, and, therefore, provides an unexpected advantage of being more operationally robust and having better thermal tolerance than a microstructured tellurite fiber.

Figure 3:
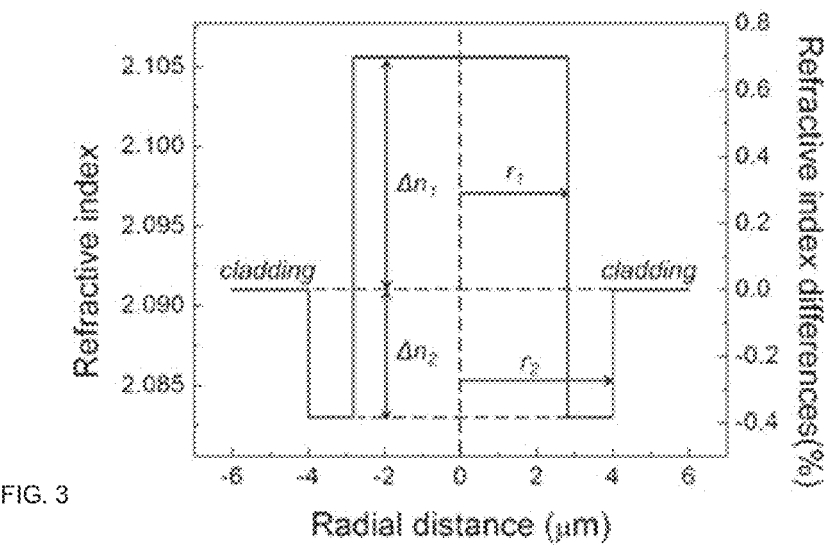
FIG. 3 is a plot of the refractive index profile of an embodiment of the W-type tellurite optical fiber of the invention ($r_1$=2.81 microns; $r_2$=4 microns; $\Delta n_1$=0.70%; $\Delta n_2$=0.38%).
Figure 4:
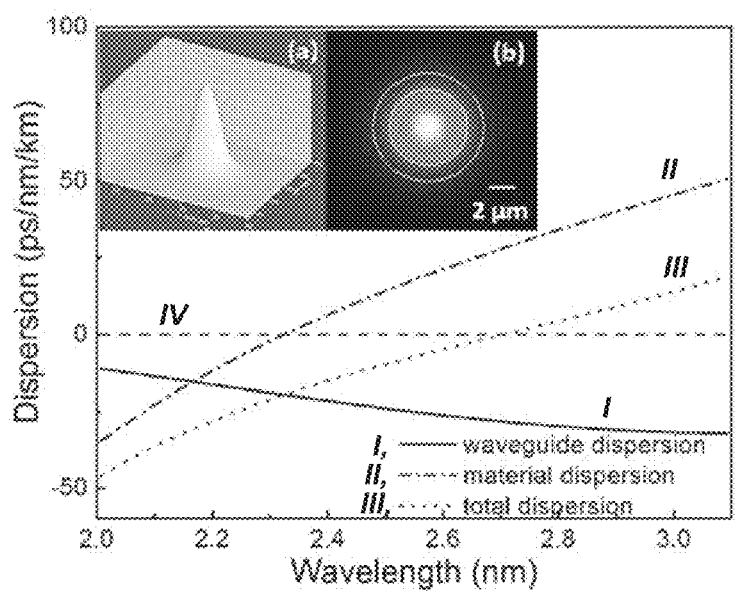
FIG. 4 includes plots showing dispersion characteristics of the embodiment of the fiber of FIG. 3 and, in inset, a 3D and a 2D intensity distributions of the fundamental mode guided in such fiber.

The index profile of one implementation of the W-type tellurite fiber according to the invention is shown in FIG. 3. The radii $r_1$ and $r_2$ are 2.81 μm and 4 μm, respectively. The refractive indices of the core and the cladding are 2.1056 and 2.091, respectively. The refractive index of the ring-region surrounding the core is set to be 2.083. The refractive index differences $\Delta n_1$ and $\Delta n_2$ are 0.70% and 0.38%, respectively. The guiding properties of this fiber were analyzed by calculating the guided modes using the full-vector modal solver of FIMMWAVE. In particular, the estimated waveguide dispersion and the total dispersion of the designed W-type tellurite fiber are shown in FIG. 4. The waveguide dispersion (shown by the solid curve I) is determined by calculating the effective refractive index of the fundamental mode and then using the equation $$D = -\frac{\lambda}{c}\frac{d^2 n}{d\lambda^2},$$

where D represents the dispersion, λ, n, and c represent the wavelength, refractive index, and the speed of light, respectively. The material dispersion (shown by the dash-dotted curve II) is calculated using the Sellmeier equation with A=2.5804773, B=1.8635211, C=6.3945516×10$^{-2}$, D=2.4311168, E=225. The total dispersion (shown by the dotted curve III) is the sum of the waveguide and material dispersions. The dashed line IV represents the zero dispersion condition. The ZDW of the tellurite glass can be seen to reside at 2.3 μm and the ZDW of the W-type tellurite fiber was shifted to 2.7 μm, at least in part due to the negative waveguide dispersion. The insets (a) and (b) of FIG. 4 show, respectively, the 3-D and 2-D intensity distributions of the fundamental mode of the W-type fiber at 2.78 μm, and provide evidence of a strictly single-mode wave-guidance for the pump laser light at 2.78 μm. It is appreciated that the ZDW can be further shifted to a longer wavelength such as, for example, 2.9 micron, by tailoring the ration of $r_1$ to $r_2$ to reach about 1.88. For the purposes of this disclosure, the wavelength range from about 2.65 microns to about 3 microns in which the pump fiber laser of the present invention operates, is defined as a spectral range of pump.

EXAMPLE 2

Mid-IR SC Generation in Different W-type Tellurite Fibers

The SC light outputs resulting from pumping optical fibers characterized by different ZDWs exhibit different operational characteristics. As discussed above, in one embodiment of the invention a shift of the ZDW of a W-type tellurite fiber was effectuated from 2.3 μm to a longer wavelength by tailoring the W-type fiber structure. In this Example 2, the SC generation in W-type tellurite fibers having different ZDWs and pumped at 2.78 μm is discussed.

Figure 5:
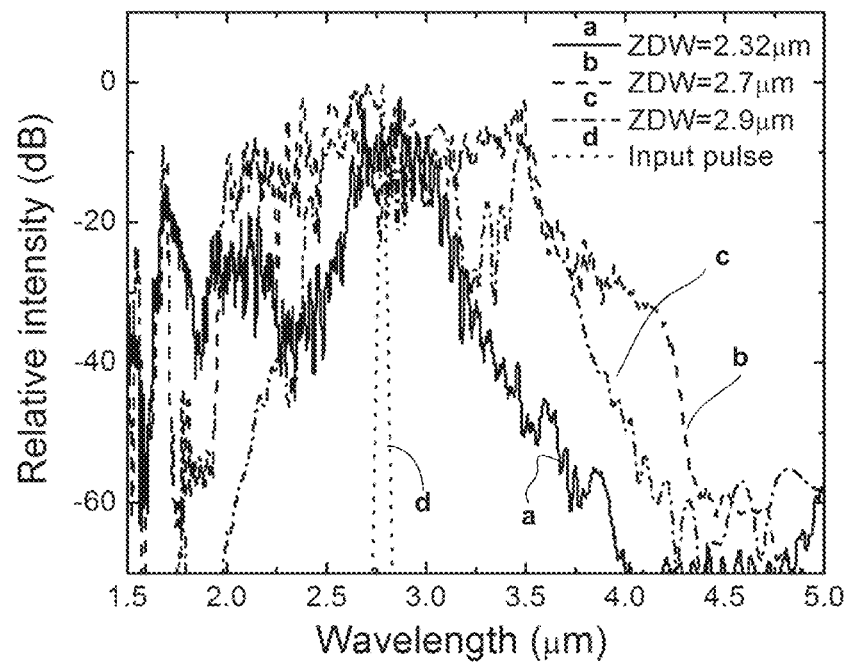
FIG. 5 includes plots representing the spectra of SC generated in 60 cm long tellurite fibers with various ZDWs, caused by 2.78 micron pump pulses of 800 fs duration and a peak power of 12 kW.

FIG. 5 illustrates the SC output produced by 60 cm tellurite fibers with ZDWs of 2.32 μm (solid curve a), 2.7 μm (dashed curve b), and 2.9 μm (dash-dotted curve c), respectively. The 2.78 μm pump pulses, used to generate such output, have a duration of 800 fs and a peak power of 12 kW, with the spectrum indicated by the curve d. As shown, the SC output generated in the tellurite fiber with a ZDW of 2.7 µm has the broadest spectrum and the best spectral flatness. Most importantly, a portion of the output power produced at wavelengths beyond 3 µm is also the largest (34.8%) among the three outputs a, b, and c. For the fiber with a ZDW of 2.32 µm (curve a), the degree of spectral extension to longer wavelengths is limited while spectral extension to shorter wavelengths, caused by the dispersion wave generation, is dominant. For the fiber with ZDW of 2.9 µm (curve c), however, the spectral broadening is caused mostly by the soliton self-frequency shift and, consequently, results in a significant spectral extension to longer wavelengths.

Figure 6:
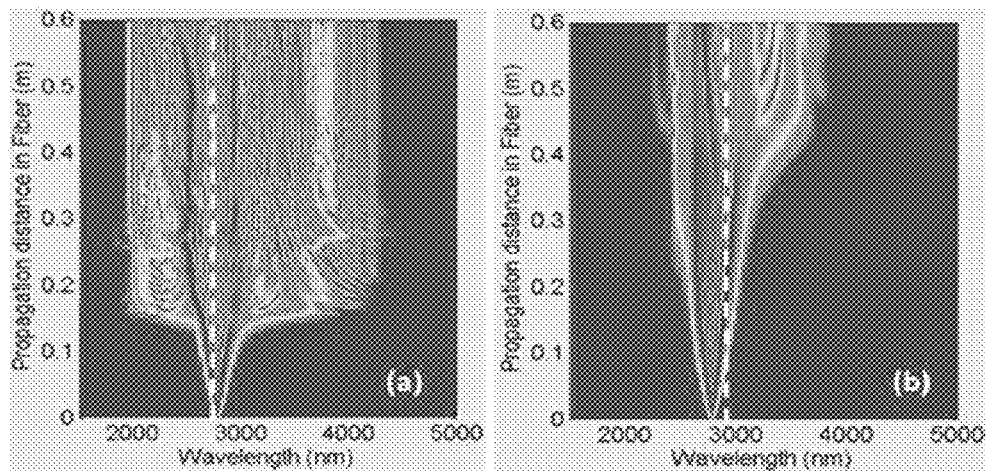
FIG. 6 shows the spectral evolution of the optical pulse at 2.78 microns in a 60 cm long tellurite optical fibers with ZDWs of (a) 2.7 microns and (b) 2.9 microns.

The mechanisms underlying the three different output spectra a, b, and c, can be better understood by considering the spectral evolution in the three fibers. The spectral evolution of the 2.78 µm pulses in the fiber with ZDW of 2.32 µm has already been plotted in FIG. 2B. The spectral evolutions in the fibers with ZDW of 2.7 µm and 2.9 µm are plotted, respectively, in FIGS. 6A and 6B. A person of ordinary skill in the art will readily appreciate that symmetrical spectral broadening is due to the dominant SPM, at the initial stage of evolution in both cases of FIGS. 6A, 6B. After this initial stage of the symmetrical spectral broadening, the spectra are significantly broadened by the development of distinct peaks on both the short- and long-wavelength sides of the input pumps because more nonlinear effects such as four-wave mixing, dispersion waves, Raman self-frequency shift, and cross phase modulation come into play. The abrupt short-wavelength edge of the SCs can be explained by the intrinsically narrowband nature of the dispersive wave resonance.

In the case of the tellurite fiber with ZDW=2.9 µm (curve c) and, notwithstanding that the pump wavelength lies in the normal GVD regime, the initial dynamics are dominated by the interaction of the SPM and normal GVD, which can transfer energy to the spectral components in the anomalous GVD regime within a propagation distance of about 20 cm because the pump wavelength is close to the ZDW. The propagation of the pulses beyond the 20 cm distance along the tellurite fiber results in the significant spectral broadening due to the soliton fission. Meanwhile, dispersion and Raman effects play roles in modifying the spectral structure.

For tellurite fibers with ZDWs of 2.32 µm and 2.7 µm (curves a and b), the pump wavelength of 2.78 µm lies in the anomalous GVD region. In this case, the spectral broadening is initially caused by the fission of higher-order solitons into red-shifted fundamental solitons and blue-shifted dispersive waves and consequently by self-frequency shift of these solitons and the soliton trapping effect between solitons and dispersive waves. Generally, as demonstrated by the results of FIGS. 5, 6A, 6B, the closer the pump wavelength to the ZDW of the fiber, the broader spectral width can be achieved and more distinct soliton peaks appear in the spectrum. The SC output generated in the fiber with ZDW of 2.7 µm (curve b) has a broader bandwidth than that of the fiber with ZDW of 2.32 µm (curve a) because the soliton fission in the fiber with ZDW of 2.7 µm is more significant. The magnitude of the soliton fission can be evaluated by soliton order, which is defined by $$N = (\gamma P_0 T_0^2 / |\beta_2|)^{1/2}, \quad (4)$$

where $P_0$ represents the input peak power and $T_0$ represents the duration of the input pulse. The soliton order of the fiber with ZDW=2.7 µm is 68.2, which is much higher than the soliton order of 22.1 for fiber with ZDW=2.32 µm. The inverse dependence of the soliton order N on the squared dispersion $|\beta_2|^{1/2}$ of Eq. (4) also indicates the advantage of the use of a pump wavelength that is spectrally closer to the ZDW.

Moreover, the present implementation provides an important advantage not realized by the related art. Specifically, a portion of the SC power output in the spectral region above the 3 µm wavelength for the fiber with ZDW of 2.7 µm is substantially larger than that of the fiber with ZDW=2.32 µm (as very much desired and required by the applications requiring significant SC output above 3 microns).

From the viewpoint of a practical application, a useful SC output or mid-IR-portion of the SC output (both terms defined as the portion of the SC power output of the all-fiber lightsource of the invention generated at wavelengths exceeding 3 µm) and the SC-output IR edge (referred to, interchangeably, as the "SC-output long-wavelength boundary" or a similar term and defined as the longest wavelength of the SC output with intensity at the −40 dB level relative to the peak intensity of the SC output), are two critical features of high power mid-IR SC laser sources. Appreciation of the importance of the dependence of either of these two figures of merit on the peak power and pulse duration of the pump pulse is essential for the development of high power mid-IR SC laser sources. We further calculated and analyzed such dependence for the SC output generated in a 60 cm W-type tellurite fiber with ZDW of 2.7 µm and pumped by 2.78 µm light-pulses having different peak powers and pulse durations.

Figure 7:
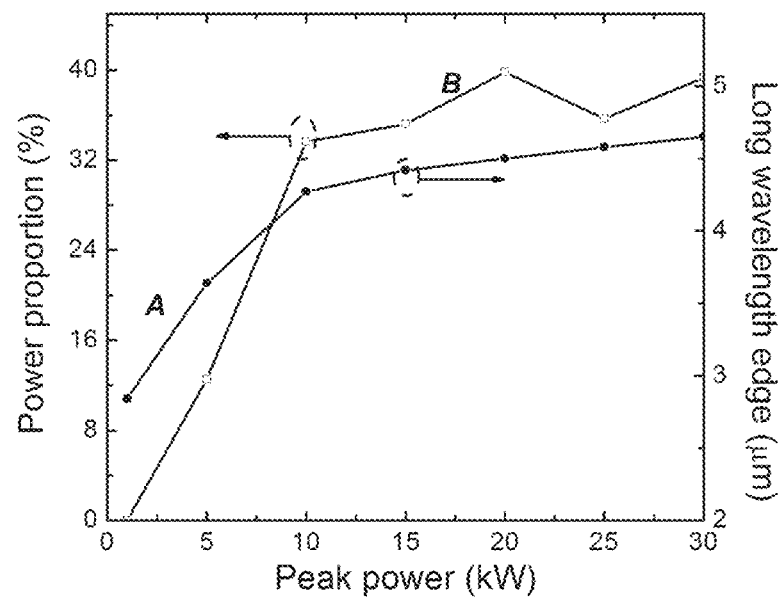
FIG. 7 depicts plots showing the useful SC output (a proportion of SC power output at wavelengths exceeding 3 microns) and the SC-output IR edge (a long wavelength edge) as a function of the peak power of 1.6 ps pump pulses.

The calculated power proportion of the SC light generated at wavelengths longer than 3 µm (useful SC output) and the long-wavelength edge of the SC as a function of the peak power of the 1.6 ps pump pulses are shown in FIG. 7 by curves A and B, respectively. Both figures of merit increase significantly with increased peak pump power when the peak power is less than about 10 kW (for example, in the first pump power range from about 1 kW to about 10 kW). When the peak power increases above 10 kW (the second pump power range), the rate of increase of the useful SC output slows. Similarly, the long-wavelength boundary of the SC-output only increases from about 4.27 µm to about 4.65 µm as the peak pump power increases from 10 kW to 30 kW. The behavior in the first pump power range is explained by the assisting influence of strong Raman-scattering on the soliton self-frequency shift. In the second pump power range, however, the SC-output long-wavelength boundary approaches the limit of the IR edge characterizing the tellurite fiber itself, and the loss greatly increases with further increase in wavelength (as was demonstrated by the inset of FIG. 1).

Figure 8:
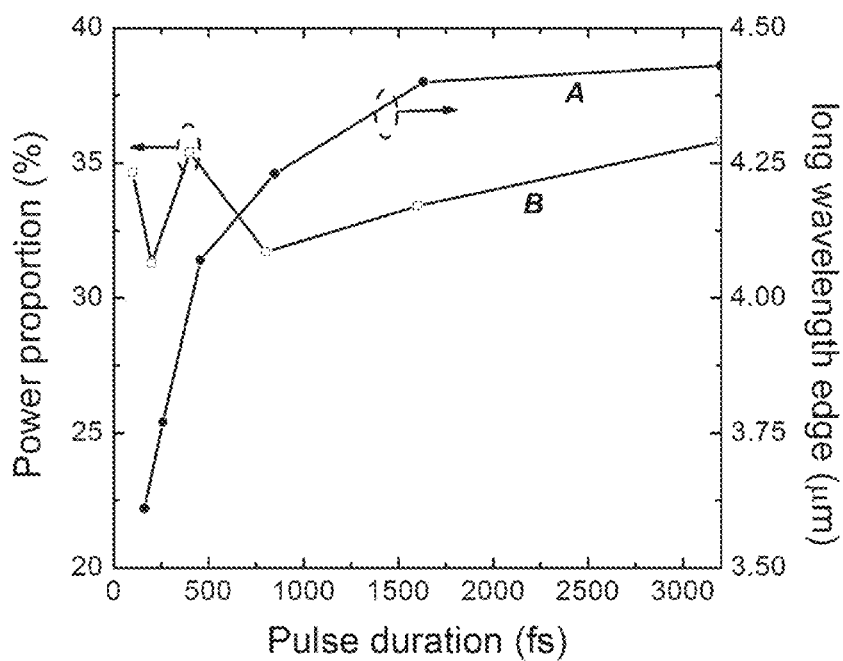
FIG. 8 includes plots showing the useful SC output (a proportion of SC power output at wavelengths exceeding 3 microns) and the SC-output IR edge (a long wavelength edge) as a function of the pulse duration of a pump pulse with peak power of 12 kW.

FIG. 8 illustrates schematically the useful mid-IR SC output and the long wavelength boundary of the SC as a function of the pulse duration of the input pump pulse. The peak power of the 2.78 µm pulse was fixed at 12 kW. The useful mid-IR SC output remains substantially the same (at about 34%) within the pulse duration range from 200 fs to 3 ps. The long-wavelength boundary of the SC output, however, increases greatly within the pump pulse duration range from 200 fs to 1.6 ps, which is attributed to the monotonic increase of the soliton order as a function of the pulse duration (according to the Eq. (4)). There is almost no change in this figure of merit as the pulse duration increases from 1.6 ps to 3.2 ps because the bandwidth of the SC light output generated by the 1.6 ps pump pulses has already reached the bandwidth limit defined by the IR edge of the tellurite fiber. FIG. 7 and FIG. 8 provide convincing evidence to a skilled artisan that an ultrafast fiber laser operating at 2.78 µm with a pulse duration of 1.6 ps and a peak power of 12 kW is well-suited as a pump source for SC generation in W-type tellurite fiber.

Power Scalability of a Tellurite Fiber SC Laser Source

The related art has not succeeded thus far in implementing tellurite fiber-based SC laser sources having operationally-meaningful levels of power output: the reported power levels are on the order of tens of mWs while the long-felt need in power required by specific mid-IR SC applications is in excess of 10 W with high spectral brightness. In stark contradistinction with tapered and microstructured fibers disclosed for mid-IR SC generation by the related art, which do not lend themselves to power-scaling of the SC output (i.e., increase of the output power to several or tens of watts), the approach presented in this disclosure practically enables output-power scaling because the discussed fiber(s) are judiciously structured to sustain much higher pump power due to the large core size and solid cladding.

Figure 9:
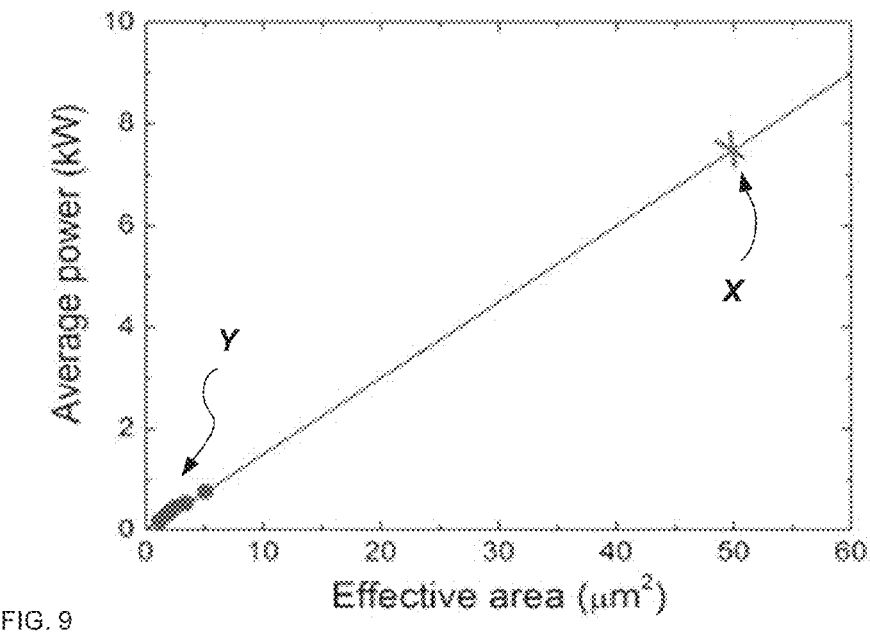
FIG. 9 is a plot illustrating sustainable power as a function of effective core area of the tellurite optical fiber(s), including that of the embodiment of the invention in comparison with those of related art.

Indeed, in order to shift the ZDW of a tellurite fiber to 2 μm or 1.5 μm (where ultrafast silica fiber lasers are readily available), the related art has proposed to reduce the core diameters of these microstructured or tapered fibers to ~3 μm or less, and the effective core areas to less than 6 μm². The implementations of the W-type fiber(s) of the present invention with ZDW=2.7 μm, on the other hand, simply do not require any comparable reduction of fiber geometry. In particular, the proposed implementations gainfully operate with a core size of about 8 μm and an effective core area of nearly 50 μm², which is a result unexpected by the related art. Consequently, the embodiments of the present invention handle much higher pump power than the microstructured or tapered fiber of the related art. Provided that the damage threshold of tellurite glass is about 15-20 GW/cm², the pump power sustainable by the tellurite fiber as a function of the effective core area is plotted in FIG. 9. The W-type fiber structured according to the embodiment of the present invention can handle more than 7 kW average pump power (plot position X), which is more than 8 times larger than the pump-power limit defining the operation of the microstructured or tapered fibers (plot positions Y) and is operationally capable, therefore, to support and accommodate high power mid-IR SC generation.

Assuming an optical-to-optical conversion efficiency of the SC of around 60%, the attainable output power of a mid-IR SC laser source based on the tellurite fiber of the present invention can easily exceed 4 kW, thereby addressing the need long-felt in industry. However, an SC fiber is often damaged in practice by heat induced effects rather than optical damage of the fiber glass. Since a 10 W SC laser source has been demonstrated in a ZBLAN fiber, it is quite feasible to develop a 100 W or higher average power SC laser source with a tellurite fiber due to its high strength, high resistance to thermal effects, and high nonlinearity (as estimated based on the thermal damage threshold of a tellurite fiber being an order of magnitude higher than that of a ZBLAN fiber)

EXAMPLE 3

Mid-IR SC Generation in a Chalcogenide Fiber

Chalcogenide glasses are known as a class of amorphous materials exhibiting high transparency over the entire mid-IR region, including the two atmospheric windows at 3-5 microns and 8-12 microns. In addition to their optical properties, these glasses are thermodynamically stable and show excellent rheological properties, which allow them to be drawn into fibers or molded into complex optical elements. The width of the optical window of a chalcogenide fiber depends on the phonon energy of the glass matrix and, in some cases, can be tuned to expand beyond 10 μm (for Se glass, for example). Therefore, a chalcogenide fiber can be used as a basis for an SC laser source at the wavelengths beyond 5 μm where the propagation loss of ZBLAN and tellurite fibers becomes operationally prohibitive. Moreover, chalcogenide glass has a very high nonlinearity ($n_2=1.5\times10^{-17}$ m²/W), which is hundreds of times higher than that of silica, which favors a very low threshold for SC generation in chalcogenide nanofibers (for example, at peak power of about 7.8 W, pulse energy of about 2.2 pJ). An $As_2Se_3$ chalcogenide fiber is but one example of a promising candidate for a mid-IR SC spanning over the two atmospheric windows. However, the ZDW of a conventional $As_2Se_3$ chalcogenide fiber is ~5 μm, which is much longer than the wavelengths of the commercially available pump laser sources as well as the 2.78 μm mode-locked $Er^{3+}$-ZBLAN fiber laser of the present invention (which is discussed below). As discussed above, a high flatness ultrabroad bandwidth SC laser source can be realized provided that the pump wavelength is close to the ZDW of the nonlinear fiber. The present invention realizes a laser source that includes an $As_2Se_3$ PCF pumped with the mode-locked $Er^{3+}$-doped ZBLAN fiber laser at 2.78 μm to generate mid-IR SC that extends, spectrally, beyond 10 μm.

Figure 10:
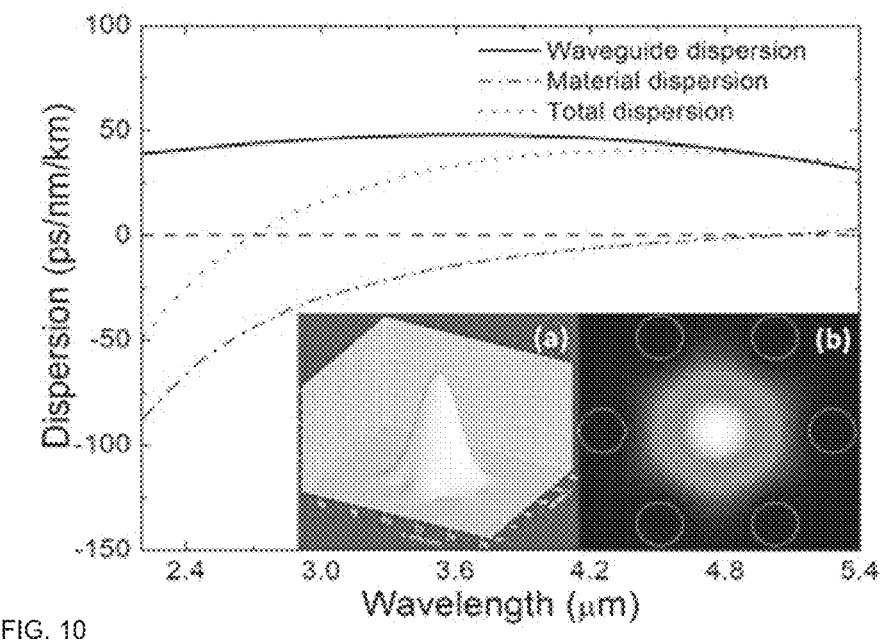
FIG. 10 includes plots showing dispersion characteristics of an embodiment of the $As_2Se_3$ PCF fiber (r=0.61 micron, $\Lambda$=3 microns) of the invention and, in inset, a 3D and a 2D intensity distributions of the fundamental mode guided in such fiber.

Design of a chalcogenide PCF. In order to shift the ZDW of a chalcogenide fiber to the wavelength of our mode-locked $Er^{3+}$-doped ZBLAN fiber laser, an $As_2Se_3$ PCF was designed with a cross-sectional structure as shown in inset (b) of FIG. 10. The core of the $As_2Se_3$ PCF was created by introducing a defect in the air-hole array, in which the air-hole radius and the pitch of the array are 0.61 μm and 3 μm, respectively. The refractive index of the background was set to be 2.78. The material, waveguide, and total dispersions of the PCF are shown in the plots of FIG. 10. The waveguide and total dispersion were calculated using the same method as that discussed above in reference to the tellurite fiber. The material dispersion was estimated using the Sellmeier equation with A=2.6, B=1.759, C=2.756×10⁻², D=0.02792, and E=101.6683. The shift of the ZDW of the $As_2Se_3$ PCF to 2.7 μm is realized due to the large positive waveguide dispersion of the PCF. The insets (a) and (b) in FIG. 10 show the 3-D and 2-D intensity distributions of the fundamental mode at the pump wavelength of 2.78 μm, respectively. The proposed implementation of the PCF exhibits excellent guiding properties for a single mode pump laser at 2.78 μm.

Figure 11:
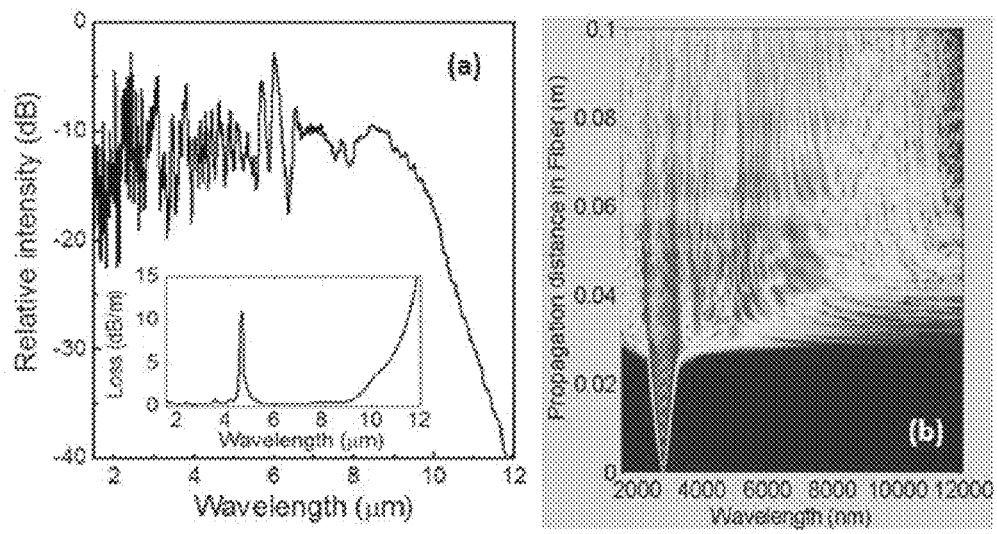
FIG. 11A illustrates the output spectrum of the SC generated in a 10 cm long $As_2Se_3$ PCF fiber of FIG. 10 with the ZDW of 2.7 microns, pumped at 2.78 microns. Inset: plots representing propagation loss of light in such fiber as a function of wavelength.
FIG. 11B shows the SC spectral evolution of the 800 fs pulse with a peak power of 1 kW in the fiber of FIG. 11A.

Mid-IR SC Generation in the $As_2Se_3$ PCF. For the purposes of the simulation, the profile of the Raman gain of $As_2Se_3$ glass was chosen to be that disclosed by R. Cherif et al. in *Opt. Eng.*, v. 49(9), p. 095002 (2010). The propagation loss of the $As_2Se_3$ chalcogenide fiber shown in the inset of FIG. 11(*a*) was determined from the loss of a Coractive $As_2Se_3$ fiber discussed by Granzow et al. in *Opt. Express*, v. 19, pp. 21003-21010 (2011). The output spectrum of 800 fs pulses with peak power of 1 kW propagating through a 10 cm $As_2Se_3$ fiber is shown in FIG. 11A. The spectral evolution of the pulses along the $As_2Se_3$ fiber was calculated and is shown in FIG. 11B. Similar to a general spectral evolution of pulses with a wavelength that is located in the anomalous GVD regime and that is close to the ZDW of the nonlinear fiber, the initial stage of the determined spectral evolution exhibits the approximately symmetrical spectral broadening, which occurs in the beginning 2.5 cm fiber segment. After propagation of about 3 cm along the fiber, the spectrum of the pulses experiences significant spectral broadening with the development of distinct spectral peaks on both the short- and long-wavelength sides of the injected pump due to soliton fission and the Raman self-frequency shift of ejected constituent fundamental solitons. The spectrum of the pulses spans over the range of 2-12 μm after a propagation of about 4 cm along the fiber. Further propagation of the pulses along the $As_2Se_3$ fiber results in increased flatness of the SC. These characteristics provide evidence that a high flatness mid-IR SC output spanning over two atmospheric windows in enabled by pumping an $As_2Se_3$ PCF with an ultrafast fiber laser at 3 μm of the invention.

Figure 12:
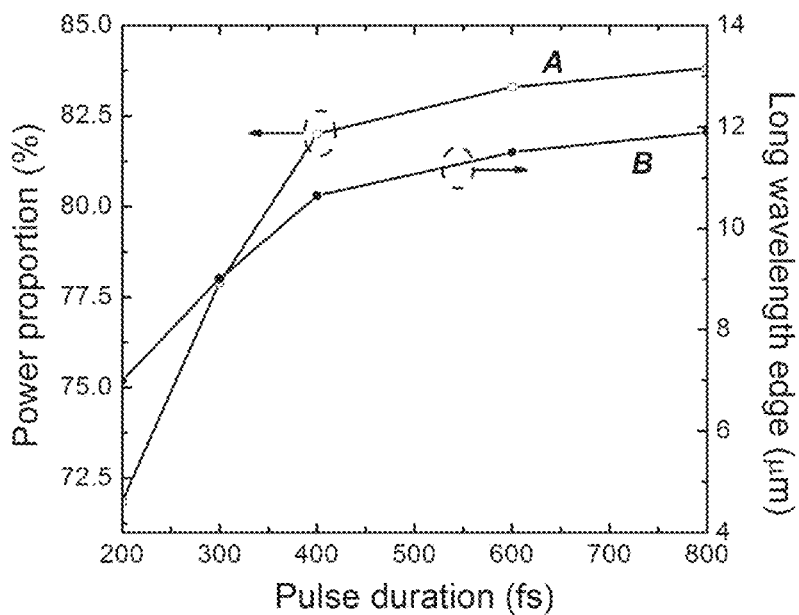
FIG. 12 includes plots showing the useful SC output (a proportion of SC power output at wavelengths exceeding 3 microns) and the SC-output IR edge (a long wavelength edge) in a 10 cm long fiber of FIG. 11A as a function of the duration of the input pulse having the peak power of 1 kW.
Figure 13:
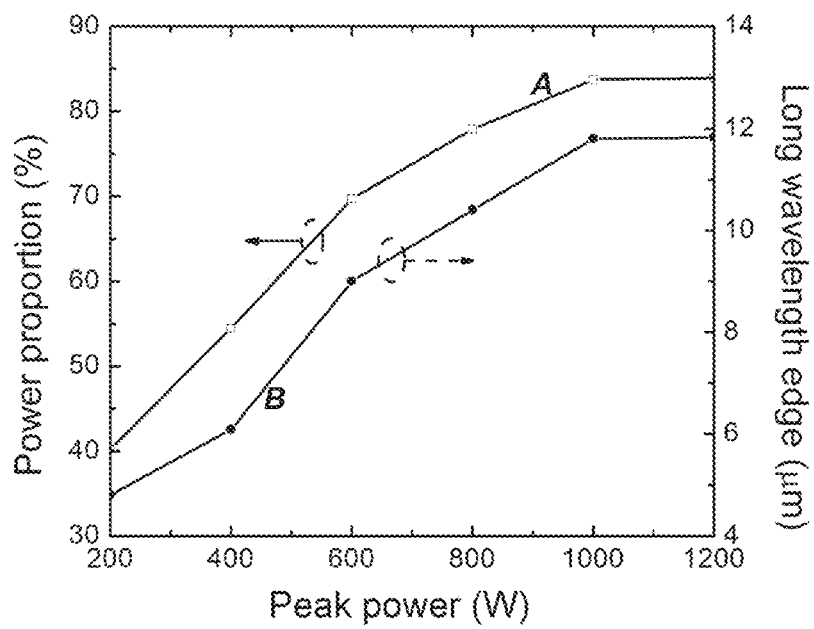
FIG. 13 includes plots showing the useful SC output (a proportion of SC power output at wavelengths exceeding 3 microns) and the SC-output IR edge (a long wavelength edge) in a 10 cm long fiber of FIG. 11A as a function of the input peak power duration of the input pulse of a 800 fs duration.

In order to guide the development of a mid-IR SC source and determine which characteristics the pump mode-locked fiber laser at 3 μm should possess for the optimization of the performance of such an SC source, we studied the dependence of the useful SC-output and the long wavelength boundary of the SC output on the input pulse duration and peak power of the pump. FIG. 12 shows the useful mid-IR SC output and the long wavelength boundary of the SC as a function of the pulse duration (curves A and B, respectively). Both figures of merit increase with increased pulse duration. As the pulse duration becomes greater than 400 fs, the growth of both the useful mid-IR SC-output and the long wavelength boundary of the SC-output slows down, which is attributed to the greatly increased loss of the $As_2Se_3$ chalcogenide fiber at wavelengths longer than 10 μm (see the inset of FIG. 11A). FIG. 13 shows the useful mid-IR SC output and the long wavelength boundary of the SC output as a function of the peak power for 800 fs pump pulses. Both of these figures of merit increase almost linearly with the peak power. The results shown in FIG. 12 and FIG. 13 provide evidence that a mid-IR SC light output with a power portion in excess of 80% (with respect to the total power of the SC output) beyond 3 μm and the long wavelength boundary up to ~12 μm can be achieved by pumping a 10 cm $As_2Se_3$ PCF with 2.78 μm 800 fs pulses with peak power of 1 kW.

Power Scalability of a Chalcogenide Fiber SC Laser Source

Figure 14:
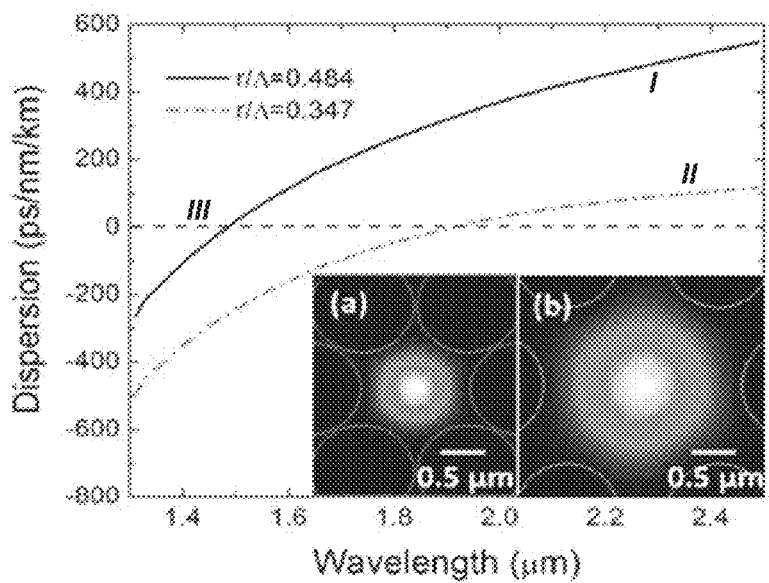
FIG. 14 includes plots showing dispersion characteristics of two $As_2Se_3$ PCF fibers characterized by specified ratios of r/Λ as a function of wavelength. Insets: (a) a profile of a fundamental mode supported by the fiber with r/Λ=0.484; (b) a profile of a fundamental mode supported by the fiber with r/Λ=0.347, at the pump wavelengths of 1.5 microns and 2 microns, respectively. The dashed line III represents the zero dispersion.
Figure 15:
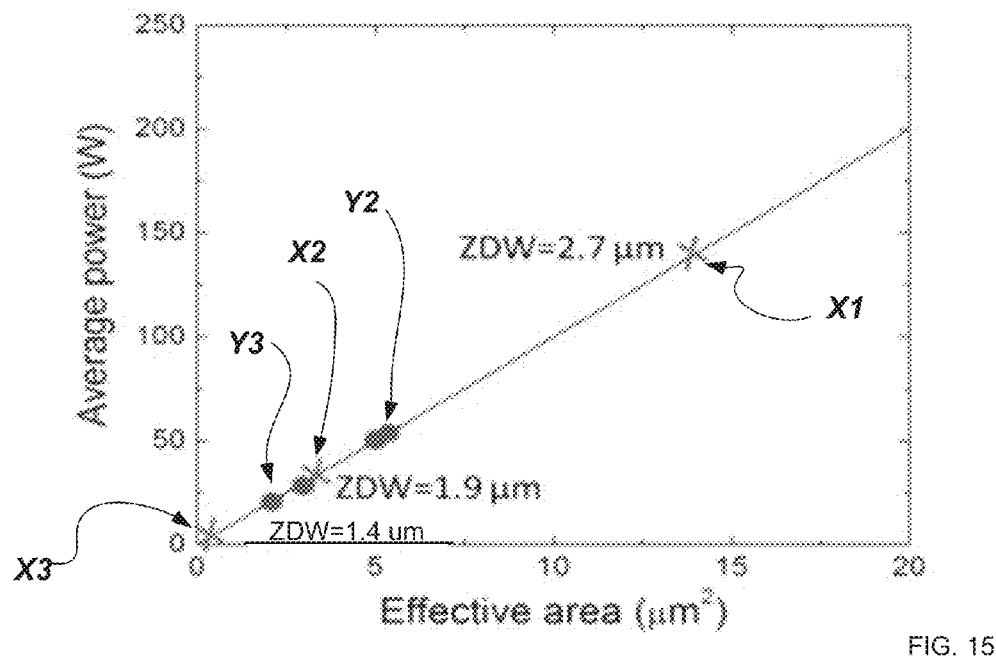
FIG. 15 is a plot illustrating sustainable power as a function of effective core area of the chalcogenide PCFs with different ZDWs, including those of the embodiment of the invention in comparison with those of related art.

As compared to a standard step-index fiber, a PCF generally sustains a lower power due to its smaller core size, low strength, and low heat dissipation ability. In addition, chalcogenide glass is known to have a much lower damage threshold (~1 $GW/cm^2$) than that of the tellurite glass. A person of skill in the art will readily appreciate that it is challenging and problematic, therefore, to achieve a high power, high flatness, ultrabroad mid-IR SC laser source using a chalcogenide PCF. Special protection and heat dissipation management have to be employed for a chalcogenide fiber SC laser source. Below, we address the power scalability of the chalcogenide fiber SC laser source by comparing the sustainable pump power for different chalcogenide PCFs and those chalcogenide fibers used in related art. The $As_2Se_3$ chalcogenide PCF designed according to an embodiment of the invention discussed above not only has the advantage of being easily fabricated (because it is relatively easier to shift the ZDW from 5 μm to 2.7 μm than from 5 μm to 1.9 μm or 1.5 μm by use of microstructured fiber construction), but also provides a benefit of having a large effective core area. The effective area of the designed $As_2Se_3$ chalcogenide PCF shown in the inset (b) of FIG. 10 is 14.38 $μm^2$, which is much larger than that of $As_2Se_3$ chalcogenide PCFs with ZDW in the near IR. For instance, two $As_2Se_3$ chalcogenide PCFs with ZDW of 1.9 μm and 1.45 μm can be designed by keeping the air hole radius constant at 0.61 μm and adjusting the ratio of the air hole radius and the pitch of the PCF (r/Λ) to be 0.347 and 0.484, respectively. The chromatic dispersions of these two PCFs are compared in FIG. 14. The profiles of the guided fundamental modes at 2 μm and 1.5 μm are plotted in insets (a) and (b) of FIG. 14, respectively. Their effective core areas are only 3.313 $μm^2$ and 0.977 $μm^2$, respectively. The calculated maximum sustainable power for all three PCFs (the $As_2Se_3$ chalcogenide fiber of the present invention and the two $As_2Se_3$ chalcogenide PCFs with ZDW of 1.9 μm and 1.45 μm) is designated in FIG. 15 by designators X1, X2, and X3. The sustainable pump power of the PCFs with ZDW of 2.7 μm is about 144 W or above, which is much larger than 33 W and 9.8 W for these two PCFs with ZDW in the near-IR. Assuming that an optical-to-optical conversion efficiency of 60% can be obtained, the SC laser source based on the $As_2Se_3$ chalcogenide PCF of the present invention can provide the attainable power of about 86.3 W. The disadvantageously lower levels of sustainable pump power of the other two chalcogenide fibers are shown for comparison in FIG. 15, with designators Y2 and Y3.

Pump Laser: Mode-locked $Er^{3+}$-doped ZBLAN Fiber Laser Operating at about 2.8 Microns.

Attempts to realize cost-effective, compact, robust, and reliable mode-locked fiber lasers has been the subject of extensive research. Because of the relatively few strong transitions of rare-earth ions ($Yb^{3+}$, $Er^{3+}$, $Tm^{3+}$, and $Ho^{3+}$) in silica or silicate glass hosts, most research on ultrafast fiber lasers has been conducted in the 1, 1.5, and 2 μm wavelength bands. At the same time, $ZrF_4$-$BaF_2$-$LaF_3$-$AlF_3$-$NaF$ (ZBLAN) glass fiber, possessing low phonon energy and the wide transparency window of ZBLAN glass, presents a good potential both as a host for a mode-locked ZBLAN fiber-based laser at many wavelengths (where mode-locked silica fiber lasers aren't viable) and for increasingly demanding applications in spectroscopic sensors, infrared countermeasures, laser surgery, and high-efficiency pump sources for longer-wavelength oscillators. $Er^{3+}$-doped ZBLAN fiber lasers, which can emit mid-IR light at 2.65-2.9 μm through the transition from the upper energy level $4I_{11/2}$ to the lower laser level $4I_{13/2}$, have attracted attention because of their broad emission range, high optical efficiency due to energy upconversion processes, and the commercial availability of diode pump lasers at the two absorption peaks of $Er^{3+}$ ions (975 and 795 nm). In recent years, a 20 W continuous-wave (CW) output at 2.8 μm from the $Er^{3+}$-doped ZBLAN fiber lasers has been demonstrated. However, there has been little progress on ultrafast mid-IR ZBLAN fiber lasers to date, and mode-locked $Er^{3+}$-doped ZBLAN fiber lasers have only been reported in instances in which the flying mirror technique and an InAs saturable absorber have been used. The flying mirror method, however, did not deliver a continuous train of mode-locked pulses and a single-mode fiber laser couldn't be mode-locked by the InAs saturable absorber due to large cavity loss. Moreover, only Q-switched mode locking has been achieved by each of these methods.

Below, a practically implemented passively mode-locked $Er^{3+}$-doped ZBLAN fiber laser is disclosed in which a $Fe^{2+}$:ZnSe crystal served as the saturable absorber, which was used with an embodiment of the SC-generating fiber laser disclosed above as a pump laser. In addition to general Q-switched mode-locking, the present embodiments of the laser implement mode-locking at 2.8 μm which, to the best of the knowledge of the inventors, remains elusive for the related art to date.

Figure 16:
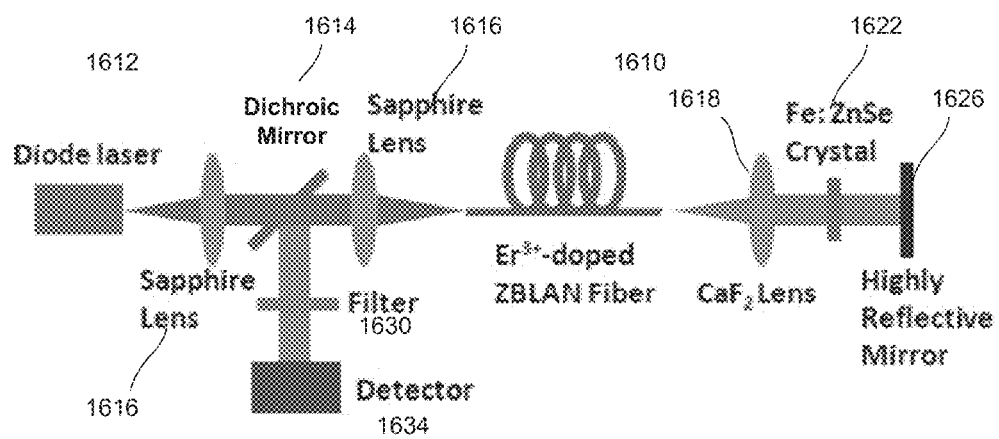
FIG. 16 is a diagram depicting schematically a passively mode-locked $Er^{3+}$ doped ZBLAN fiber laser of the invention.

The experimental setup of the passively mode-locked $Er^{3+}$-doped ZBLAN fiber laser is depicted in FIG. 16. The gain fiber 1610 was a piece of 1.6 m double-clad 8 mol % $Er^{3+}$-doped ZBLAN fiber, with a core diameter of 15 μm and a core numerical aperture (NA) of 0.1. The inner circular cladding has a diameter of 125 μm and an NA of 0.5 that allowed efficient coupling of the pump light from a 976 nm diode laser 1612 through two antireflection-coated sapphire lenses with focal lengths of 25 mm. A dichroic mirror 1614, which had a high reflection of >99% at 2.7 μm and high transmission (in excess of 95%) at 976 nm, was disposed between the two sapphire lenses 1616 to couple the laser beam out. The fiber at the pump launching side was straight-cleaved and its end face functioned as an output coupler via Fresnel reflection. The other end of the fiber was angle-cleaved to eliminate the influence of Fresnel reflection. The emerging laser beam was collimated by a $CaF_2$ lens 1618 (focal length 25 mm) and reflected backward by a highly reflective gold mirror. A $Fe^{2+}$:ZnSe crystal 1622, which served as the saturable absorber, was put between the CaF$_2$ lens and the highly reflective mirror 1626 to achieve CW mode-locked operation. A long-wavelength pass filter (>2 μm) 1630 was placed before the detector 1634 to filter out the background light. The pulse trains were measured with a fast InSb infrared detector with a rise time of 7 ns and recorded by an oscilloscope with 100 MHz bandwidth.

Figure 17:
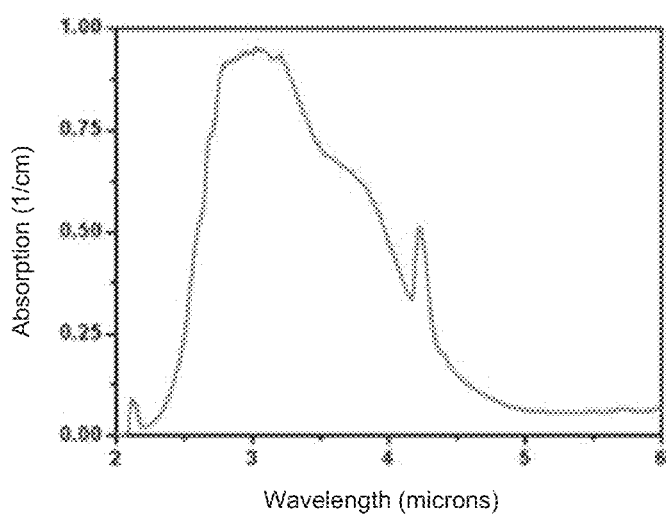
FIG. 17 is a plot showing the spectral distribution of the absorption coefficient of the $Fe^{2+}$:ZnSe crystal used in the set-up of FIG. 16 as an optical absorber.

To set a pulsed regime of operation, the Fe$^{2+}$:ZnSe crystal was used as a saturable absorber; the spectral distribution of absorption coefficient is plotted in FIG. 17. Fe$^{2+}$:ZnSe (fabricated, for example, by IPG Photonics) is characterized by its large saturable absorption cross-section and small saturation energy along with the practical opto-mechanical characteristics (damage threshold 2 J/cm2) and the physical characteristics of the crystalline ZnSe host.

Figure 18:
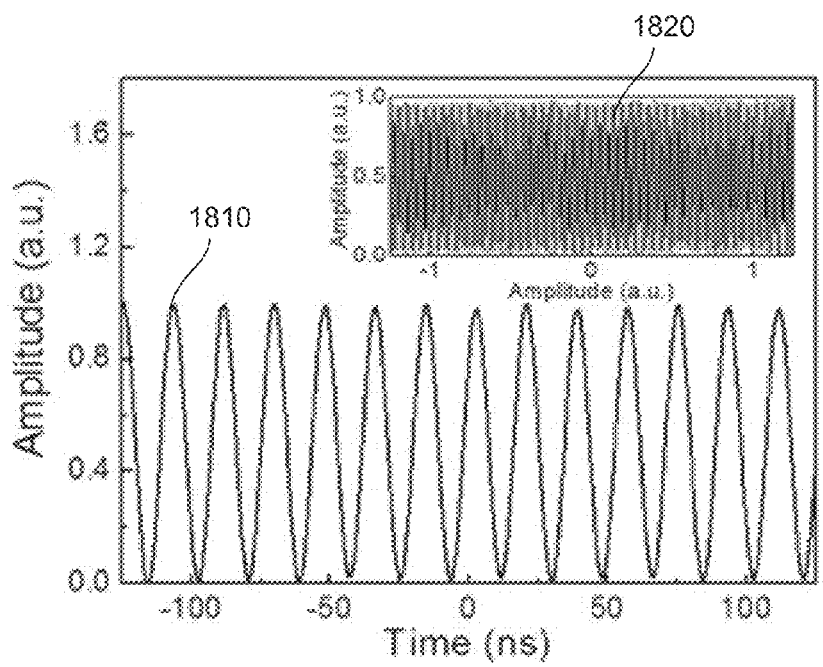
FIG. 18 is a plot illustrating a pulse train of the CW mode-locked $Er^{3+}$ doped ZBLAN fiber laser of the invention over a 250 ns duration. Inset: the pulse train over a 2 microsecond duration.

When placed between the CaF$_2$ lens and the high-reflectance mirror of the embodiment of FIG. 16, the Fe$^{2+}$:ZnSe saturable absorber enabled the stable mode-locking operation of the Er$^{3+}$-doped ZBLAN fiber laser at an average output power of about 51.4 mW. FIG. 18 shows the mode-locked pulse train 1810 over a 250 ns duration when the launched pump power was around 300 mW. The repetition rate of the mode-locked fiber laser was about 50 MHz. The zero base of the pulse train cannot be exhibited due to the long response time (7 ns) of the InSb detector. The inset shows a pulse train 1820 of 2.4 μs duration, confirming the mode-locking operation.

Figure 19:
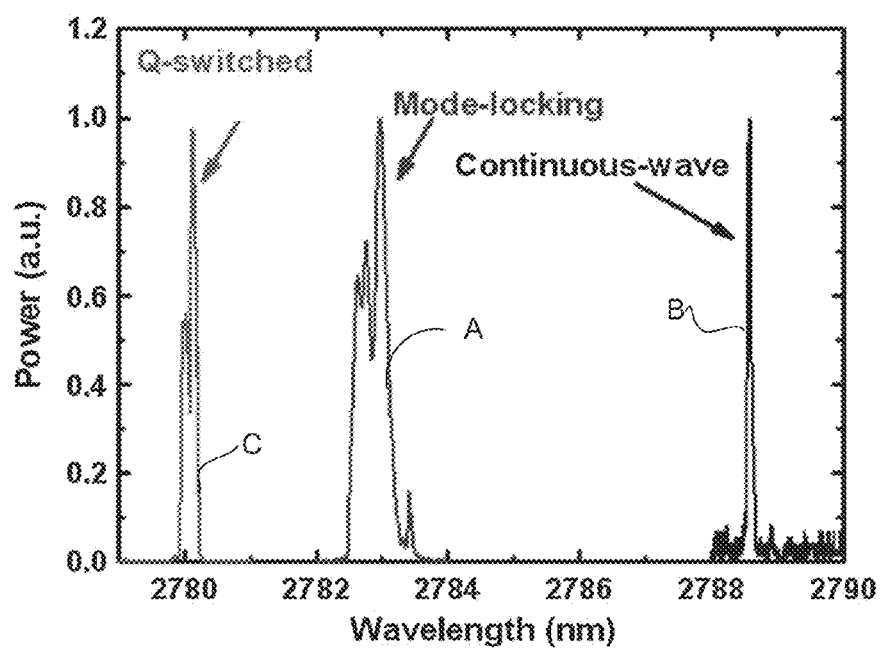
FIG. 19 shows normalized spectra of the Q-switched operation of the $Er^{3+}$ doped ZBLAN fiber laser of the invention, mode-locking operation of the same, CW-mode-locking operation of the same, and CW operation of the same.

The optical spectrum of mode-locked pulses, as measured by a Horiba iHR550 monochromator, is shown in FIG. 19, curve A. The central wavelength is 2783 nm and the full width at half-maximum (FWHM) is about 0.6 nm. The pulse duration was estimated to be 19 ps from the spectral bandwidth (under the assumption that the pulse had a Gaussian temporal shape and was transform limited). The pulse energy was estimated to be 0.93 nJ, accordingly. As a comparison, the spectrum of the Er$^{3+}$-doped ZBLAN fiber laser under CW operation (obtained by removing the saturable absorber) was measured at the same pump power and shown in FIG. 19, in curve B. The wavelength is 2788.6 nm and the FWHM is about 0.06 nm. The power for CW operation was measured to be 78.6 mW; the wavelength for CW operation was longer than that for the CW mode-locking operation because the cavity loss was smaller, and the laser worked more efficiently with the Fe$^{2+}$:ZnSe saturable absorber crystal removed.

Figure 20:
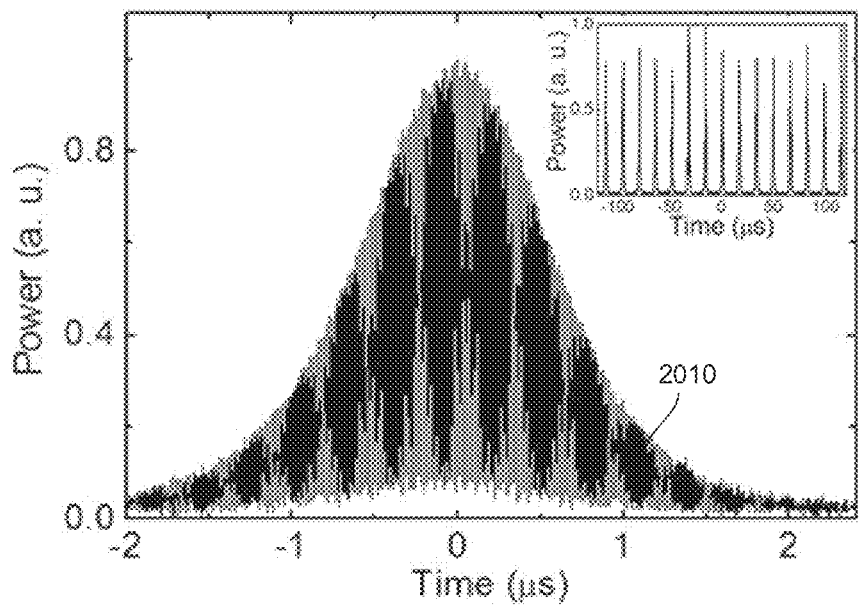
FIG. 20 illustrates a pulse train of the Q-switched mode-locked $Er^{3+}$ doped ZBLAN fiber laser of the invention over a 4 microsecond duration. Inset: the pulse train over a 250 microsecond time window.

When the Fe$^{2+}$:ZnSe crystal was placed very close to the angle-cleaved fiber end, the laser started to operate in the Q-switched mode-locking regime as the pump power exceeded the threshold. The spectrum for the Q-switched mode locking was measured and is shown in FIG. 19, curve C. The wavelength of operation is about 2780 nm, and the FWHM is about 0.2 nm. The pulse duration for Q-switched mode locking was estimated to be about 60 ps. FIG. 20 shows the pulse train 2010 of the Q-switched mode-locking operation when the launched pump power was 350 mW. The average output power was measured to be 4.6 mW, which is much smaller than that for mode locking. The inset of FIG. 20 illustrates the pulse train over a 250 μs time span, with the repetition rate of the Q-switched pulses of 61.5 kHz, and the FWHM of the Q-switched pulse envelope of 1.25 μs. The Q-switching envelope became more stable as the pump power was increased, but the mode locking was gradually extinguished. When the launched pump power was 820 mW, complete Q-switched operation was achieved (with a repetition rate of 119 kHz, a pulse width of 0.65 μs, and an average output power of 33 mW).

References made throughout this specification to "one embodiment," "an embodiment," "a related embodiment," or similar language mean that a particular feature, structure, or characteristic described in connection with the referred to "embodiment" is included in at least one embodiment of the present invention. Thus, appearances of these phrases and terms may, but do not necessarily, refer to the same implementation. It is to be understood that no portion of this disclosure, taken on its own and in possible connection with a figure, is intended to provide a complete description of all features of the invention.

In addition, the following disclosure may describe features of the invention with reference to corresponding drawings, in which like numbers represent the same or similar elements wherever possible. It is understood that in the drawings, the depicted structural elements are generally not to scale, and certain components may be enlarged relative to the other components for purposes of emphasis and clarity of understanding. It is also to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described single features, structures, or characteristics of the invention may be combined in any suitable manner in one or more further embodiments.

Moreover, in the schematic logical flow chart diagram the depicted order and labeled steps of the logical flow are indicative of one embodiment of the presented method. Other steps and methods may be conceived that are equivalent in function, logic, or effect to one or more steps, or portions thereof, of the illustrated method.

Embodiments of the present invention demonstrated mid-IR SC-generating laser sources based on a dispersion-engineered W-type tellurite fiber and As$_2$Se$_3$ chalcogenide PCF, pumped with an ultrafast fiber laser at 2.78 μm. The studies of the power proportion of the SC output extending beyond 3 μm and the long wavelength boundary of the mid-IR SC as a function of the peak power and pulse duration of the input pulse showed that a long-wavelength boundary of 4.65 μm and an approximately 40% useful SC-output (that beyond 3 μm) can be generated in a W-type tellurite fiber with a 1.6 ps pulsed pump laser having a peak power of 30 kW, while with a chalcogenide PCF pumped by 1 kW 800 fs pulses a SC-output with a long-wavelength boundary up to 12 μm and with >80% of useful SC can be realized. As compared to the SC fibers used in related art, the attainable output power of the W-type tellurite fiber can be increased by one order of magnitude and that of the As$_2$Se$_3$ chalcogenide PCF can be increased three-fold, thereby providing evidence that a W-type tellurite fiber is a promising candidate for 10 W to 100

W mid-IR SC laser sources in the 3-5 atmospheric window and that the $As_2Se_3$ PCF has the potential to generate a mid-IR SC covering the 3-5 μm and 8-10 μm atmospheric windows and most molecular "fingerprint" spectral regions.

The invention as recited in claims appended to this disclosure is intended to be assessed in light of the disclosure as a whole, including features disclosed in prior art to which reference is made.

As used herein, the terms "substantially", "about", "approximately" and the like are defined as terms referring to a value, of a parameter to which these terms refer, measured with means and/or methods recognized for such measurement in the art and taking into account measurement errors typical for such measurement. For example, the reference to a value of zero dispersion wavelength as being substantially equal to the lasing wavelength of the pump laser implies that, when measured according to methods used in related art for such purpose, the value of the ZDW of the optical fiber in questions is found to be deviating from the lasing wavelength of the pump laser by no more than a typical experimental error.

While the invention is described through the above-described exemplary embodiments, it will be understood by those of ordinary skill in the art that modifications to, and variations of, the illustrated embodiments may be made without departing from the inventive concepts disclosed herein. Disclosed aspects, or portions of these aspects, may be combined in ways not listed above. Accordingly, the invention should not be viewed as being limited to the disclosed embodiment(s).

What is claimed is:

1. An all-optical-fiber light source comprising:
    an $Er^{3+}$-doped pump fiber laser structured to generate light at a lasing wavelength within a spectral range of pump; and
    a non-silica-glass optical fiber in optical communication with said pump fiber laser and having a zero-dispersion wavelength substantially equal to the lasing wavelength;
    said all-optical-fiber light source producing a supercontinuum (SC) light power output in the spectral region exceeding 3 microns, when the non-silica-glass fiber is pumped by said pump fiber laser operating in a pulsed regime at the lasing wavelength,
    wherein a ratio of said SC light power output to a total light power output of said all-optical-fiber light source exceeds 40 percent, and
    wherein a long-wavelength boundary of said SC light power output exceeds 4 microns.

2. An all-optical-fiber light source according to claim 1, wherein the non-silica-glass optical fiber includes a tellurite fiber having a zero-dispersion wavelength of about 2.7 micron defined at least in part by a negative waveguide dispersion of said fiber, and wherein said pump fiber laser includes a mode-locked $Er^{3+}$-doped ZBLAN pump fiber laser generating light at the lasing wavelength of about 2.78 microns and power exceeding 4 kW.

3. An all-optical-fiber light source according to claim 2, wherein a SC power output of the light source is scalable in excess of 7 kW while maintaining power density in said fiber below a damage threshold of tellurite glass.

4. An all-optical-fiber light source according to claim 2, wherein the tellurite fiber includes a W-type tellurite fiber.

5. An all-optical-fiber light source according to claim 1, wherein the non-silica-glass optical fiber includes an $As_2Se_3$ chalcogenide optical fiber having a zero-dispersion wavelength of about 2.7 microns defined at least in part by a positive waveguide dispersion of said fiber, and wherein said pump fiber laser includes a mode-locked $Er^{3+}$-doped ZBLAN pump fiber laser generating light at the lasing wavelength of about 2.78 microns and power of about 144 W or above.

6. An all-optical-fiber light source according to claim 1, wherein the non-silica-glass optical fiber includes a chalcogenide PCF optical fiber having a zero-dispersion wavelength of about 2.7 microns, and wherein said pump fiber laser includes a mode-locked $Er^{3+}$-doped ZBLAN pump fiber laser generating light at the lasing wavelength of about 2.78 microns with powers of about 1 kW and a pulse duration of less then 1 ps.

7. An all-optical-fiber light source according to claim 6, wherein the ratio exceeds 80 percent and the long-wavelength boundary exceeds 11 microns.

8. A pulsed fiber laser comprising:
    an $Er^{3+}$-doped ZBLAN optical fiber having input and output facets; and
    a saturable absorber in optical communication with the output facet of said optical fiber;
    wherein, when energized with light at about 976 nm through the input facet, said optical fiber generates a train of pulses at a lasing wavelength of about 2.78 microns.

9. A fiber laser according to claim 8, wherein said saturable absorber includes a $Fe^{2+}$:ZnSe crystal, and wherein said fiber laser is operable in a mode-locking regime.

10. A fiber laser according to claim 8, further comprising:
    a non-silica-glass optical fiber in optical communication with the output facet and having a zero-dispersion wavelength substantially equal to the lasing wavelength;
    said fiber laser producing a supercontinuum (SC) light power output in a spectral region exceeding 3 microns, when pumped by said train of pulses.

11. A fiber laser according to claim 10, wherein a ratio of said SC light power output to a total light power output of said fiber laser exceeds 40 percent, and wherein a long-wavelength boundary of said SC light power output exceeds 4 microns.

12. A fiber laser according to claim 10, wherein the ratio exceeds 80 percent and the long-wavelength boundary exceeds 11 microns.

13. A fiber-laser according to claim 11, wherein the non-silica-glass optical fiber includes a chalcogenide PCF optical fiber having a zero-dispersion wavelength of about 2.7 microns, and wherein said pump fiber laser includes a mode-locked $Er^{3+}$-doped ZBLAN pump fiber laser generating light at the lasing wavelength of about 2.78 microns with powers of about 1 kW and a pulse duration of less then 1 ps.

* * * * *